US 6,542,657 B2

(12) United States Patent  
Anderson

(10) Patent No.: US 6,542,657 B2
(45) Date of Patent: Apr. 1, 2003

(54) BINARY SWITCH FOR AN OPTICAL WAVELENGTH ROUTER

(75) Inventor: Robert Anderson, Boulder, CO (US)

(73) Assignee: Network Photonics, Inc., Boulder, CO (US)

( * ) Notice: Subject to any disclaimer, the term of this patent is extended or adjusted under 35 U.S.C. 154(b) by 32 days.

(21) Appl. No.: 09/745,760

(22) Filed: Dec. 20, 2000

(65) Prior Publication Data
US 2002/0076137 A1 Jun. 20, 2002

(51) Int. Cl.⁷ ................................................ G02B 6/26
(52) U.S. Cl. ......................................... 385/18; 385/21
(58) Field of Search .............................. 385/16–18, 20, 385/21; 359/223, 226, 290, 627

(56) References Cited

U.S. PATENT DOCUMENTS

| 5,414,540 A | 5/1995 | Patel et al. |
| 5,917,625 A | 6/1999 | Ogusu et al. |
| 5,960,133 A | 9/1999 | Tomlinson |
| 5,999,672 A | 12/1999 | Hunter et al. ................. 385/37 |
| 6,097,519 A | 8/2000 | Ford et al. ................... 359/130 |
| 6,097,859 A * | 8/2000 | Solgaard et al. .............. 385/17 |
| 6,108,471 A | 8/2000 | Zhang et al. ................. 385/37 |
| 6,253,001 B1 * | 6/2001 | Hoen .......................... 385/16 |
| 6,307,657 B1 | 10/2001 | Ford |
| 6,330,102 B1 * | 12/2001 | Daneman et al. ........... 359/290 |
| 6,337,760 B1 * | 1/2002 | Huibers et al. ............. 359/223 |
| 6,501,877 B1 | 12/2002 | Weverka et al. |

OTHER PUBLICATIONS

Rallison, R.D., "Dense Wavelength Division Multiplexing (DWDM) and the Dickson Grating," White Paper, Jan. 6, 2001.

Grade, John D. et al., "A Large–Deflection Electrostatic Actuator For Optical Switching Applications," Solid–State and Actuaotr Workshop, Hilton Head Island, SC, pp. 97–100 (Jun. 2000).

Sun, et al., "Demultiplexer with 120 Channels and 0.29–nm Channel Spacing," IEEE Photonics Technology Letters, vol. 10, No. 1, Jan. 1998, pp. 90–92.

Philippe et al., "Wavelength demultiplexer: using echelette gratings on silicon substrate," Applied Optics, vol. 24, No. 7, Apr. 1985, pp. 1006–1011.

Piezo Systems, Inc. Catalog #2, 1998, pp. 1, 30–45.

Ford et al., "Wavelength Add–Drop Switching Using Tilting Micromirrors," Journal of Lightwave Technology, vol. 17, No. 5, May 1999, pp. 904–911.

* cited by examiner

Primary Examiner—Hemang Sanghavi
Assistant Examiner—Omar Rojas
(74) Attorney, Agent, or Firm—Townsend and Townsend and Crew LLP

(57) ABSTRACT

An apparatus and method for routing optical signals between a pair of input ports and a pair of output ports is provided. An optical switching arrangement adapted to shift among at least two distinct optical configurations is provided for directing the optical signals. In the first configuration, the optical signal from the first (second) input port is directed to the first (second) output port. In the second configuration, the optical signal from the first input port is discarded and the optical signal from the second input port is directed to the first output port.

51 Claims, 5 Drawing Sheets

BINARY SWITCH FOR AN OPTICAL WAVELENGTH ROUTER

CROSS-REFERENCES TO RELATED APPLICATIONS

This application is being filed concurrently with related U.S. patent applications: "1×2 OPTICAL WAVELENGTH ROUTER," by Robert Anderson, Ser. No. 09/745,459; and "WAVELENGTH ROUTER WITH STAGGERED INPUT/OUTPUT FIBERS," by Robert Anderson and Samuel P. Weaver, Ser. No. 09/747,064, both of which are herein incorporated by reference in their entirety for all purposes.

BACKGROUND OF THE INVENTION

This application relates generally to fiber-optic communications and more specifically to techniques and devices for routing optical signals to different output ports (or, conversely, routing different spectral bands at the output ports to the input port).

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called an optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications, are too big, expensive and unreliable for widespread deployment. New integrated solid-state technologies based on new materials are being researched, but are still far from commercial application.

Consequently, the industry is aggressively searching for an all-optical wavelength routing solution that enables cost-effective and reliable implementation of high-wavelength-count systems.

SUMMARY OF THE INVENTION

Embodiments of the invention are directed to an optical routing apparatus for directing two optical signals between two input ports and two output ports. Each optical signal follows a path defined by an optical switching arrangement that is adapted to shift among at least two distinct optical configurations. In the first optical configuration, the optical signal provided by the first input port is directed to the first output port and the optical signal provided by the second input port is directed to the second output port. In the second optical configuration, the optical signal provided by the second input port is instead directed to the first output port, while the optical signal provided by the first input port is directed to neither output port. In this manner, a variation of a 2×2 optical switch is provided. Improvements in bandwidth over a 2×2 switch are achieved when wavelength-multiplexed optical signals are used. For example, when such a modified 2×2 switch (i.e. a "2×2' switch") is used in an add-drop multiplexer configuration, it remains possible to add a signal with wavelength $\lambda_1$ and drop a signal with wavelength $\lambda_2$ from a trunk signal.

In one embodiment, the optical switching apparatus has two fixed mirrors and two rotatable mirrors. The positions of the two rotatable mirrors are linked so that the first optical configuration is defined by one position for each rotatable mirror and the second optical configuration is defined by a second position for each rotatable mirror. The path of each optical signal of interest includes a reflection off a fixed mirror and off one of the rotatable mirrors. It is preferable that the input and output ports be spaced at the confocal length of one of the optical signals to improve reintegration of the optical signals at the output ports. Where this confocal length is less than the diameter of the optical fibers used to provide the input and output ports, the optical fibers are preferably flattened, such as by shaving a portion of the fibers' cladding layer.

In another embodiment, the optical switching apparatus uses only a single rotatable mirror with four fixed mirrors. The rotatable mirror has two positions that define the two configurations of the optical switching apparatus. The optical signals are directed so that they are reflected off two of the fixed mirrors and off the rotatable mirror between the fixed-mirror reflections. Accordingly, the rotatable mirror is placed at a focus defined by the arrangement of fixed mirrors. In an alternative embodiment, the four fixed mirrors are substituted with a single mirror having a focus where the rotatable mirror is positioned. Such a single mirror may include a composite mirror or may include a curved mirror, such as a portion of a rotated conic section. The path lengths of the optical pathways are preferably equalized. This is achieved in one embodiment by staggering the input and output ports so that they do not lie in a plane.

In still another embodiment, a rotatable mirror configured to have three positions is used with three fixed mirrors to define a 2×2' optical switch. In this embodiment, only one of the optical signals provided by the input ports is of interest in any particular configuration. In one exemplary embodiment, when the rotatable mirror is in its first position, the optical signal provided by the first input port is directed to the second output port; when the rotatable mirror is in its second position, the optical signal provided by the first input port is directed to the first output port; and when the rotatable mirror is in its third position, the optical signal provided by the second input port is directed to the second output port. In alternative embodiments, the three fixed mirrors are substituted with a single mirror, which may be composite or curved to define a focus at the position of the rotatable mirror. It is also preferable to equalize path lengths, such as by staggering the input and output ports.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DESCRIPTION OF THE SPECIFIC EMBODIMENTS

I. Introduction

The following description sets forth embodiments of an optical switch for use in an optical wavelength router according to the invention. Embodiments of the invention can be applied to network elements such as optical add-drop multiplexers (OADMs) and wavelength-selective cross-connects (WSXCs), among others, to achieve the goals of optical networking systems.

The general functionality of one optical wavelength router that can be used with the embodiments of the invention is described in detail in the copending, commonly assigned U.S. patent application, filed Nov. 16, 1999 and assigned Ser. No. 09/442,061, entitled "Wavelength Router," which is herein incorporated by reference in its entirety, including the Appendix, for all purposes. As described therein, such an optical wavelength router accepts light having a plurality of spectral bands at an input port and selectively directs subsets of the spectral bands to desired ones of a plurality of output ports. As used herein, the terms "input port" and "output port" are intended to have broad meanings. At the broadest, a port is defined by a point where light enters or leaves the optical router. For example, the input (or output) port could be the location of a light source (or detector) or the location of the downstream end of an input fiber (or the upstream end of an output fiber).

Embodiments of the invention are described below for a form of optical switch referred to herein as the "2×2'" switch. Appropriate modifications will be apparent to those of skill in the art upon reading such description. The 2×2' switch is similar to a "2×2" switch, which is used to direct a pair of signals from two input ports to two output ports. Such a 2×2 switch has one configuration ("passthrough") in which the signal from the first (second) input port is directed to the first (second) output port and another configuration ("crossed") in which the signal from the first (second) input port is directed to the second (first) output port. The 2×2 switch is thus configured to propagate a total of four signals. By sacrificing the propagation of one of these four signals in applications where it is unneeded, the 2×2' switch can achieve corresponding benefits.

This may be illustrated with an exemplary embodiment in which the 2×2' switch is used as part of an add-drop multiplexer. In such an embodiment, the two input ports correspond to a "trunk in" and an "add" port; the two output ports correspond to a "trunk out" port and a "drop" port. The three routings to be used are: (1) from the "trunk in" port to the "trunk out" port; (2) from the "trunk in" port to the "drop" port; and (3) from the "add" port to the "trunk out" port. The 2×2' switch may thus be used to add a signal of wavelength $\lambda_1$ and drop a signal of wavelength $\lambda_2$ from a trunk line.

Figure 1:
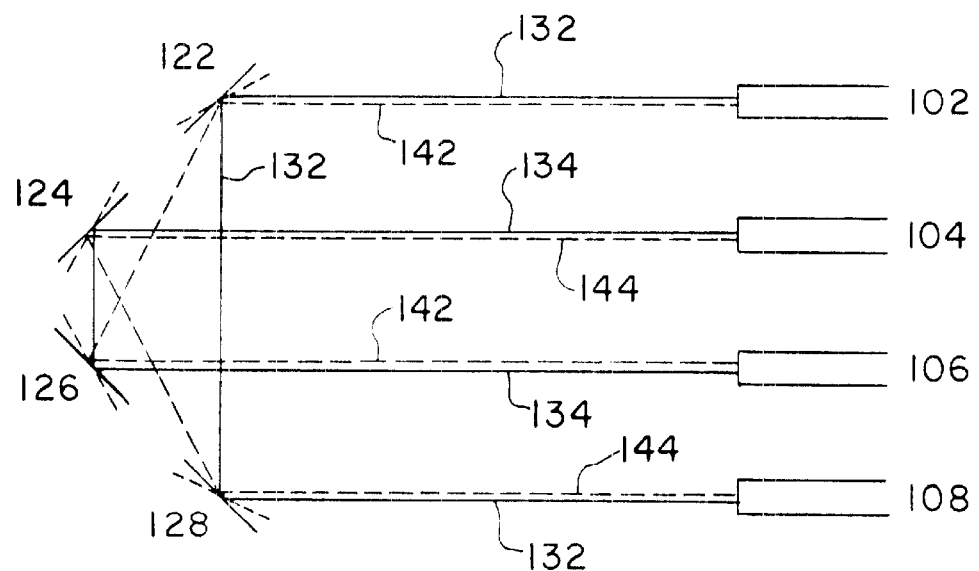
FIG. 1 illustrates schematically a 2×2 optical switch that requires the use of four rotatable micromirrors.

For example, as shown in FIG. 1 (see also FIGS. 5A-5D of U.S. patent application Ser. No. 09/442,061), the 2×2 switch may be implemented with four rotatable microelectromechanical system ("MEMS") micromirrors. Because the optical signal is demultiplexed into multiple wavelength components, each MEMS micromirror shown in the illustrated configurations may thus denote an array of MEMS micromirrors for acting on each of these individual wavelength components.

In FIG. 1, the switch operation is illustrated for the passthrough configuration with solid lines and for the crossed configuration with dashed lines. In the passthrough configuration, an optical signal from input port 102 is directed along path 132 to output port 108, being reflected off micromirrors 122 and 128, and an optical signal from input port 104 is directed along path 134 to output port 106, being reflected off micromirrors 124 and 126. All four micromirrors 122–128 are rotated to the dashed positions when the switch is in the crossed configuration. In that configuration, an optical signal from input port 102 is directed along path 142 to output port 106, being reflected off micromirrors 122 and 126, and an optical signal from input port 104 is directed to output port 108, being reflected off micromirrors 124 and 128. It is evident that the switch requires that four micromirrors be precisely rotatable.

Figure 2:
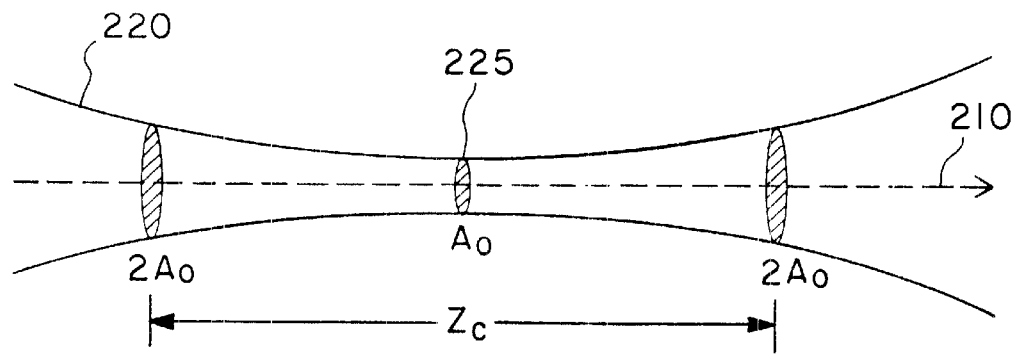
FIG. 2 shows the beam shape of an optical signal, illustrating that the beam is narrowest in the confocal region of the beam.

The use of multiple micromirrors increases the electromechanical complexity of the switch and limits the potential bandwidth. The effect on bandwidth can be understood by recognizing that the optical beam, rather than propagating with a point cross-section, has a characteristic narrowing shape. This shape is illustrated in FIG. 2, where the beam 220 is propagating along axis 210. The narrow portion of the beam 225 is referred to as the "beam waist." The length of the beam waist is defined by the confocal length $z_c$ of the beam, which is a measure of the distance along the propagation axis 210 over which the area of the beam first narrows from twice the beam waist 225 size and the expands back to twice its size at the beam waist 225, i.e. from $2A_0$ to $A_0$ to $2A_0$.

Bandwidth is related to the movement of each of the wavelength components of the optical signal along a mirror as the signal is modulated. For example, if a particular wavelength component has a spot size of 11 $\mu$m at the focal point and each MEMS micromirror has a diameter of 50 $\mu$m, the available bandwidth is restricted because the modulation cannot be so great that the spot strikes an unintended nearby mirror. When there is more than a single MEMS array, it is impossible to position all of the MEMS arrays at the focal points for all individual wavelength components because of the characteristic beam shape. Accordingly the spot size on the same size mirror is larger, restricting the possible beam modulation even further. Maximal bandpath is thus available where the micromirrors are positioned in the confocal zone, and if the spot size is as great as the mirror diameter (i.e. $\geq 50$ $\mu$m in the example), then the available bandwidth is zero. Accordingly, optical signal bandwidth can generally be improved with embodiments in which the number of MEMS micromirror arrays is limited.

Embodiments of the invention using the 2×2' switch described below thus make use of fixed mirrors or reflective surfaces, thereby simultaneously reducing the electromechanical complexity of the switch and permitting increased bandwidth.

II. Dual MEMS Mirror 2×2' Optical Switch

Figure 3:
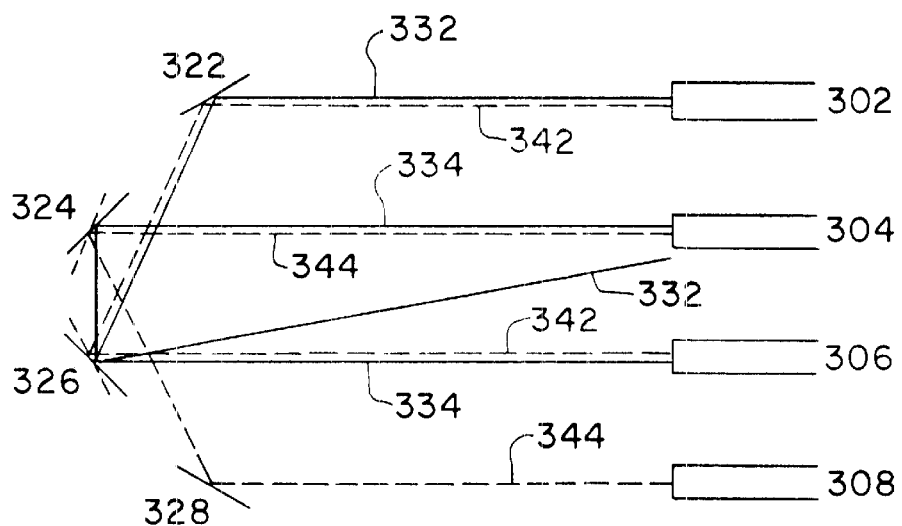
FIG. 3 is a schematic representation of optical paths taken for a 2×2' switch that uses two rotatable micromirrors and two fixed mirrors.

In one embodiment, the 2×2' switch is implemented with only two MEMS micromirrors, as illustrated in FIG. 3. In this embodiment, row mirrors 322 and 328 are fixed mirrors while mirrors 324 and 326 may each be in one of two positions, indicated by the solid and dashed lines. The paths followed by the optical signals are similarly shown with solid and dashed lines for the two mirror positions used.

When the MEMS micromirrors 324 and 326 are in the first (solid) configuration, the optical signal from input port 304 is directed to output port 306, reflecting off both MEMS micromirrors 324 and 326. In this configuration, the optical signal from input port 302 is simply lost after being reflected from row mirror 322 and MEMS mirror 326. When the MEMS micromirrors 324 and 326 are in the second (dashed) configuration, both optical signals from the input ports 302 and 304 are directed to output ports 306 and 308 after reflecting off a row mirror and a MEMS mirror. In this instance, the optical signal from input port 302 is directed to output port 306 after reflecting off row mirror 322 and MEMS mirror 326. The optical signal from input port 304 is directed to output port 308, being reflected by MEMS mirror 324 and row mirror 328.

Where this embodiment of the 2×2' switch is used as an add/drop multiplexer, the "trunk in" signal originates at input port 304 and the "trunk out" signal is received at output port 306; the add signal originates at input port 302 and the drop signal is received at output port 308. It is thus evident that this configuration permits addition of a signal of wavelength $\lambda_1$ and dropping of a signal of wavelength $\lambda_2$ from a trunk line. Addition and dropping of a signal of the same wavelength is prohibited. When the switch is incorporated as part of a wavelength router, arrays of such 2×2' switches are used to direct a plurality of spectral bands.

Figure 4:
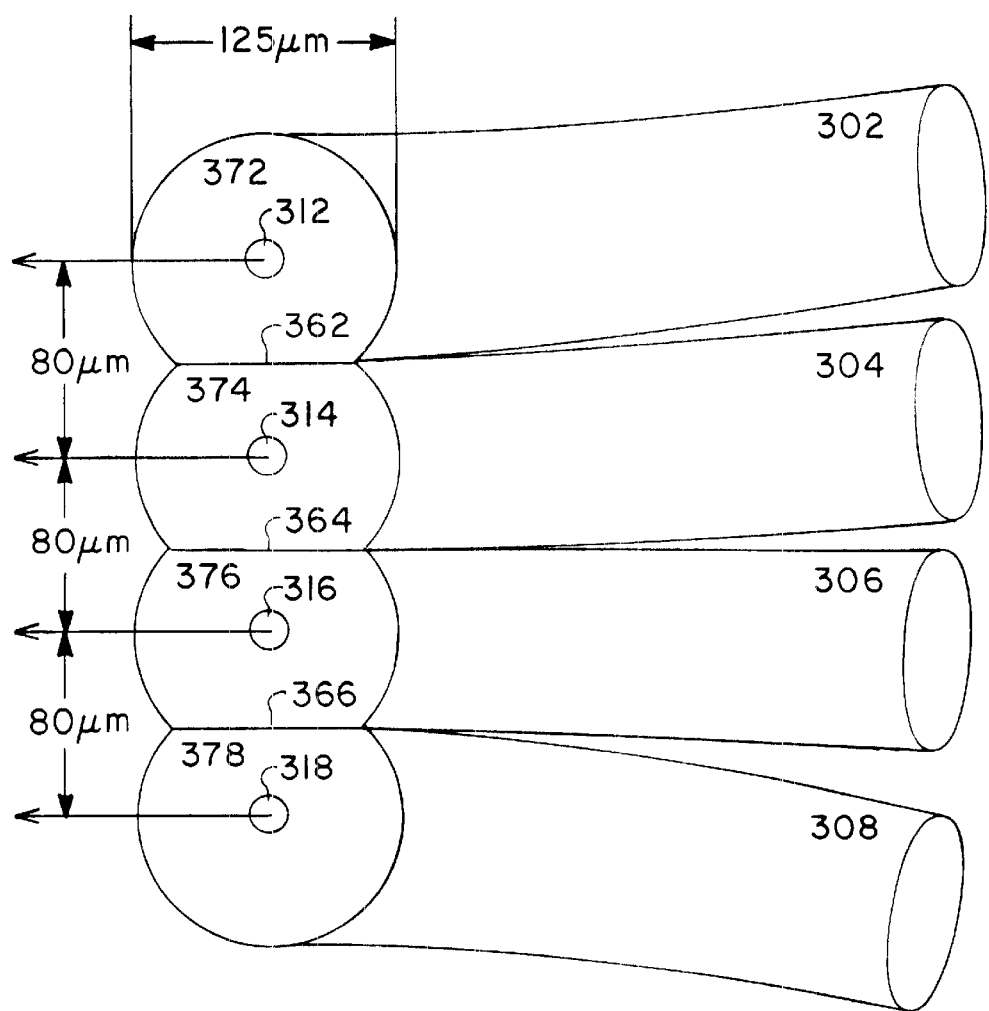
FIG. 4 illustrates how optical fibers are flattened to meet preferred confocal length restrictions on the spacing between input and output ports.

The preferred positioning of the mirror arrangement can be understood with reference to FIG. 4. Because reintegration of an added signal at an output port requires relatively precise focusing of the signal, it is preferred that the fiber spacing be such that the difference is lengths along the longest and shortest paths be less than the confocal length of the beam, i.e. approximately 80 $\mu$m for signals in the near-infrared (700–1600 nm) primarily used for silica glass fibers. Imposition of this condition limits the spacing between input port 304 and output port 306 to be approximately 80 $\mu$m.

As known to those of skill in the art, optical fibers are constructed with a core 312, 314, 316, or 318 surrounded by glass or plastic cladding layer 372, 374, 376, or 378. The core typically has a diameter of 9, 10, or 11 $\mu$m and is has a higher index of refraction than the cladding layer so that total internal reflection will guide light along the core without loss. The standard outside diameter of the cladding layer for telecommunications fibers is 125 $\mu$m. The cladding layer for commercially available telecommunications fibers is coated with a 250-$\mu$m-diameter polymer layer (not shown). To apply the confocal-length condition with such fibers, in one embodiment, the polymer layer is stripped and the cladding layers of adjacent fibers are shaved as illustrated in FIG. 4. The shaving has the effect of flattening the fibers so that their cores can be brought sufficiently close to satisfy the confocal-length condition. Accordingly, the shaved edges of the fibers are joined at interfaces 362, 364, and 366 in the illustrated embodiment. Alternatively, the fiber cores may be brought sufficiently close together by other techniques, including polishing and material processing.

III. Single Two-Position MEMS Mirror 2×2' Optical Switch

Figure 5:
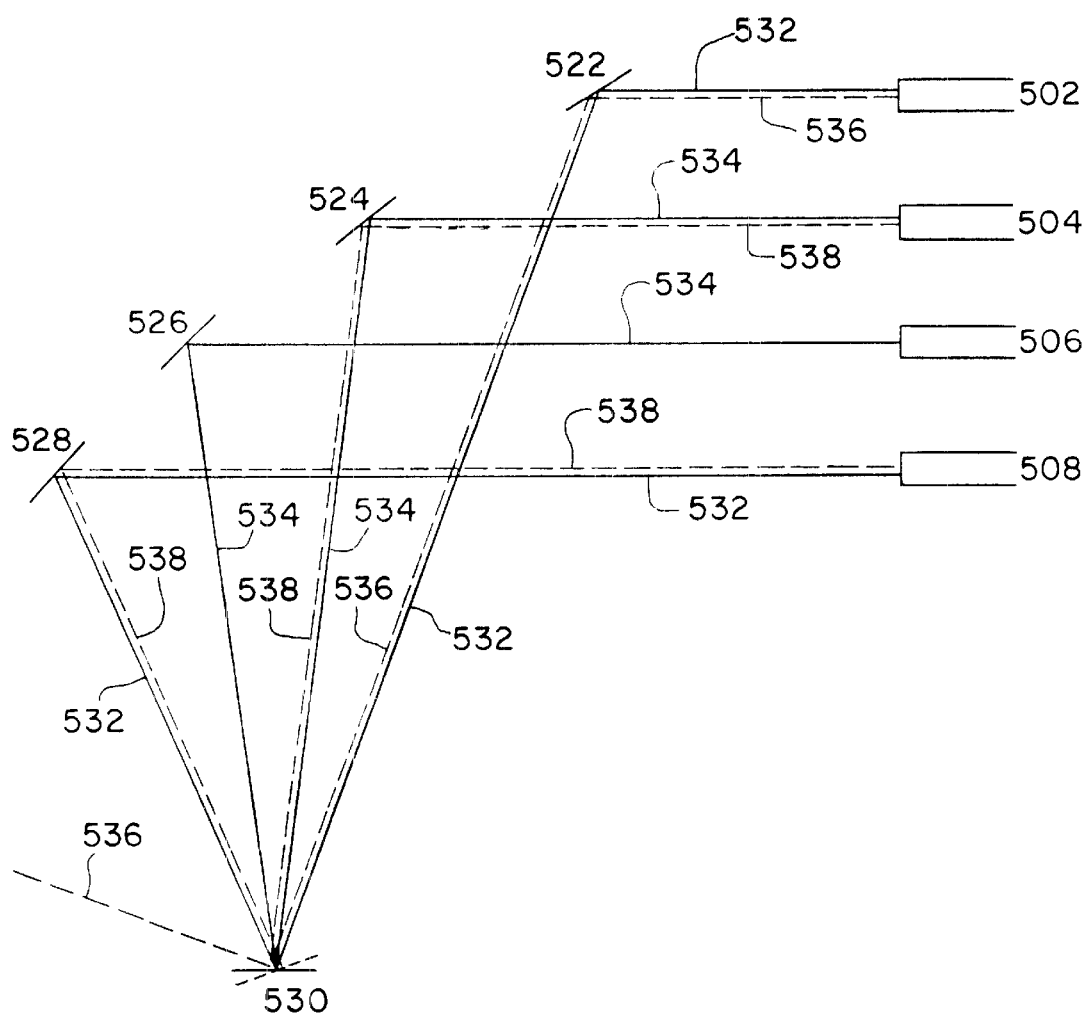
FIG. 5 is a schematic representation of optical paths taken for a 2×2' optical switch that uses a single rotatable micromirror and four fixed mirrors.

In another embodiment, the 2×2' switch is implemented with only a single MEMS micromirror, as illustrated in FIG. 5. In this embodiment, four fixed row mirrors 522, 524, 526, and 528 are used with a single rotatable MEMS mirror 530, which may be in one of two positions, indicated by the solid and dashed lines. The paths followed by the optical signals are similarly shown with solid and dashed lines for the two possible positions of the MEMS mirror 530.

When the MEMS mirror 530 is in its first (solid) position, the optical signal from input port 502 is directed to output port 508, propagating along path 532 so that it is reflected off fixed mirror 522, MEMS mirror 530, and fixed mirror 528. Similarly, the optical signal from input port 504 is directed to output port 506, propagating along path 534 so that it is reflected off fixed mirror 524, MEMS mirror 530, and fixed mirror 526. When the MEMS mirror 530 is instead rotated to its second (dashed) position, the optical signal from input port 502 is propagated along path 536. It reflects off of fixed mirror 522 and MEMS mirror 530, whereupon it is simply lost. The optical signal from input port 504 is directed to output port 508 along path 538. This path includes reflections off fixed mirror 524, MEMS mirror 530, and fixed mirror 528.

Thus, where this embodiment of the 2×2' optical switch is used as an add/drop multiplexer, the "trunk in" signal originates at input port 504 and the "trunk out" signal is received at output port 508. The "add" signal originates at input port 502 and the "drop" signal is received at output port 506. In the solid switch position, therefore, a signal of wavelength $\lambda_1$ can be added while a signal of wavelength $\lambda_2$ can be dropped, while in the dashed position, the trunk signal is simply directed from "trunk in" to "trunk out."

Because only a single MEMS mirror 530 is used, it can be positioned at a focal point of the arrangement of the four fixed mirrors 522, 524, 526, and 528. This allows not only further improvement in the potential bandwidth when arrays of such configurations are used for a demultiplexed signal, but also relaxes the restriction on spacing the fiber cores at the confocal length. Accordingly, the fibers may be spaced farther apart so that stripping the polymer layer and modifying the cladding layer is unnecessary.

Figure 6A:
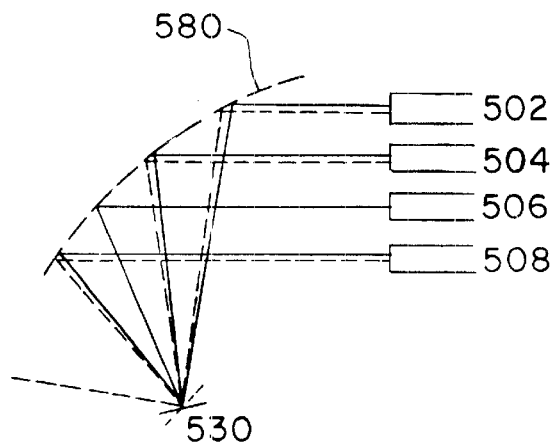
FIG. 6(a) is an alternative embodiment to that shown in FIG. 5 where the four fixed mirrors are replaced with a single composite mirror.
Figure 6B:
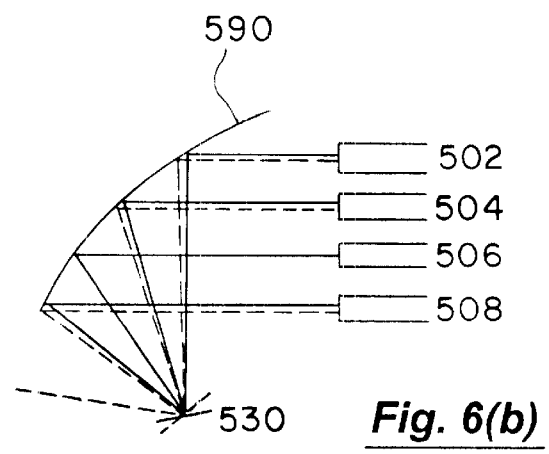
FIG. 6(b) is an alternative embodiment to that shown in FIG. 5 where the four fixed mirrors are replaced with a single curved mirror.

Furthermore, although the fixed mirrors are shown in FIG. 5 as four discrete fixed mirrors, they may alternatively be replaced with a focusing composite mirror 580 that consists of multiple discrete planar faces (FIG. 6(*a*)) or with a continuous curved mirror 590 (FIG. 6(*b*)). In either alternative embodiment, the MEMS mirror 530 is positioned at the focus of such a mirror. Thus, in various embodiments, the continuous curved mirror 590 is a portion of a rotated conic section, i.e. the mirror 590 is spherical, parabolic, elliptical, or hyperbolic.

While positioning the MEMS mirror 530 at the focal point of the fixed reflecting surface(s) has these advantages, the total path length followed by various optical signals for each configuration of the MEMS mirror 530 may be different. It is preferable to equalize the total path length for such different optical signals to facilitate reintegration of the optical signals at the output ports. One such method for equalizing the path length is to stagger the optical fibers leading to the input and/or output ports so that the ends of the ports do not necessarily lie in a plane. Such a method produces the desired equalization and is described in the concurrently filed and commonly assigned application entitled "OPTICAL WAVELENGTH ROUTING ELEMENT WITH STAGGERED FIBERS," Ser. No. 09/747,064 Dec. 20, 2000, which has been incorporated by reference for all purposes.

Figure 7:
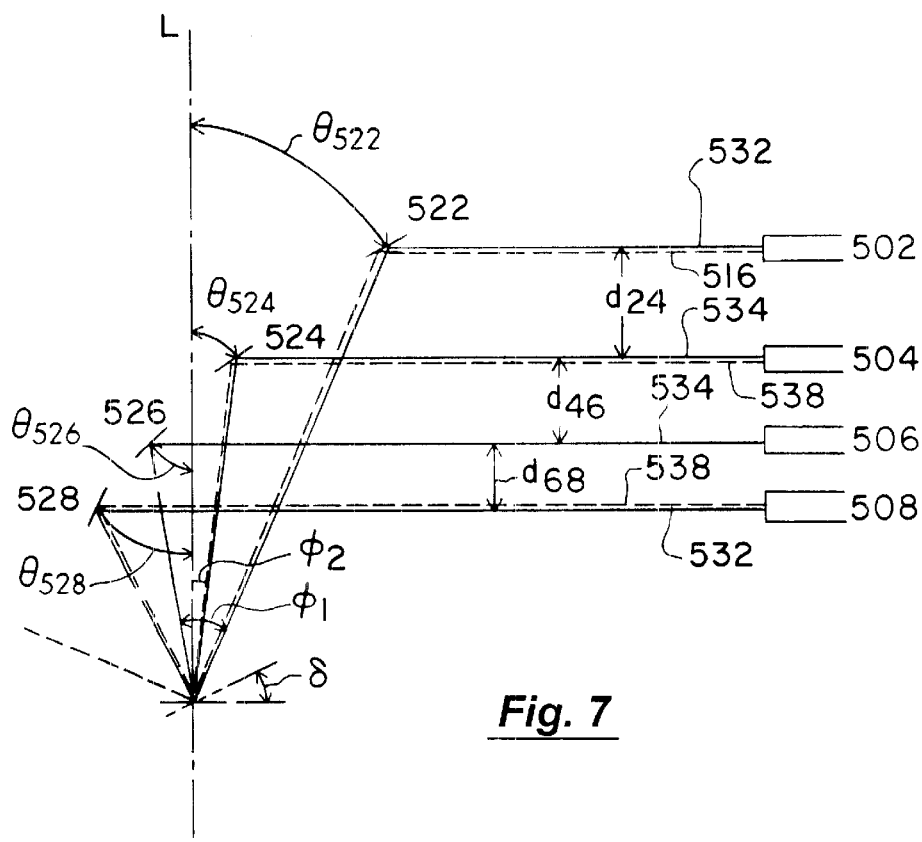
FIG. 7 is a particular embodiment of that shown in FIG. 5, in which the input and output ports are not staggered relative to one another.

It is also possible in various embodiments to achieve path-length equalization by having the input and output ports spaced apart unequally, with appropriate angles of inclination for the fixed mirrors. One such embodiment is shown in FIG. 7, in which input port 504 is spaced a distance $d_{24}$ from input port 502, output port 506 is spaced a distance $d_{46}$ from input port 504, and output port 508 is spaced a distance $d_{68}$ from output port 506. The tilt of each of the fixed mirrors is defined by an angle $\theta_M$ measured from line L, which is orthogonal to the propagation direction to and from the output and input ports. Where the spacing of the input and output ports is such that the relative separations $d_{24}:d_{46}:d_{68}$ are approximately 1.77:1.28:1.00, the tilt of the fixed mirrors can be expressed in terms of the angular deflection 6 of the MEMS mirror between the two configurations:

$$\theta_{522}=45°+1.5\ \delta;$$

$$\theta_{524}=45°+0.5\ \delta;$$

$$\theta_{526}=45°-0.5\ \delta;$$

$$\theta_{528}=45°-1.5\ \delta.$$

Thus, for example, in one particular embodiment in which the MEMS mirror angular deflection is $\delta=8°$, $d_{24}=531$ μm, $d_{46}=384$ μm, and $d_{68}=300$ μm, with $\theta_{522}=57°$, $\theta_{524}=49°$, $\theta_{526}=41°$, and $\theta_{528}=33°$. In that embodiment, when the MEMS mirror is in the solid position, optical path 532 has an angle of incidence on the MEMS mirror of $\psi_1=2\delta=16°$ and optical path 534 has an angle of incidence of $\psi_1=\delta=8°$.

IV. Single Three-Position MEMS Mirror 2×2' Optical Switch

Figure 8:
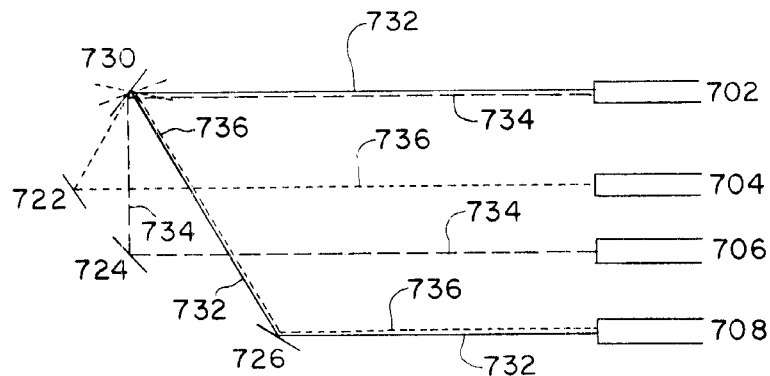
FIG. 8 is a schematic representation of optical paths taken for a 2×2' optical switch that uses a single rotatable micromirror and three fixed mirrors.

In still another embodiment illustrated in FIG. 8, a 2×2' optical switch includes a single three-position MEMS mirror 730. The three-position mirror has a rest position denoted by dashes, with two stop positions on either side of the rest position, denoted respectively by a solid line and by dots. Three fixed mirrors 722, 724, and 726 are also provided, each corresponding to one position of the MEMS mirror 730. For example, when the MEMS mirror 730 is in its rest position (dashed), the optical signal is propagated from input port 702 to output port 706 along path 734, being reflected off the MEMS mirror 730 and off fixed mirror 724. When the MEMS mirror 730 in the first stop position (solid), the optical signal from input port 702 is instead directed to output port 708, propagating along path 732, which includes reflections off the MEMS mirror 730 and off fixed mirror 726. The other stop position (dotted) of the MEMS mirror 730 is used for directing an optical signal from input port 704 to output port 708. In this case, the signal propagates along path 736, reflecting off fixed mirror 722, MEMS mirror 730, and fixed mirror 726.

The operation of this configuration as a 2×2' optical switch can be understood by examining its operation as an add/drop multiplexer with the "trunk in" and "add" signals originating respectively at input ports 702 and 704, and the "drop" and "trunk out" signals being received respectively at output ports 706 and 708. With this arrangement, the rest position (dashed) of the MEMS mirror 730 permits dropping a signal from the trunk; the first stop position (solid) corresponds to a passthrough of the trunk; and the second stop position (dotted) permits adding a signal to the trunk. Accordingly, it is possible to add a signal with wavelength $\lambda_1$ or drop a signal with wavelength $\lambda_2$ ($\lambda_1$).

Figure 9A:
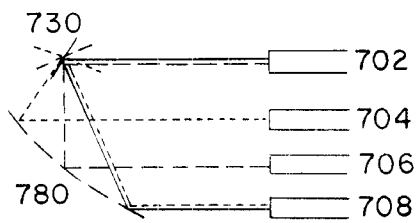
FIG. 9(a) is an alternative embodiment to that shown in FIG. 8 where the three fixed mirrors are replaced with a single composite mirror.
Figure 9B:
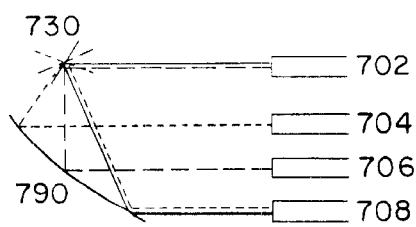
FIG. 9(b) is an alternative embodiment to that shown in FIG. 8 where the three fixed mirrors are replaced with a single curved mirror.

As for the two-position MEMS mirror embodiment described above, it is not necessary that there be three discrete mirrors as illustrated in FIG. 8. Instead, the three fixed mirrors may alternatively be replaced with a focusing composite mirror 780 that consists of multiple discrete planar faces (FIG. 9(*a*)) or with a continuous curved mirror 790 (FIG. 9(*b*)). In either alternative embodiment, the MEMS mirror 730 is positioned at the focus of the mirror. Thus, in various embodiments, the continuous curved mirror 790 is a portion of a rotated conic section, i.e. the mirror 790 is spherical, parabolic, elliptical, or hyperbolic. It is also preferable that path lengths be equalized. This may be done in one embodiment by staggering the input and output ports as described above.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. An optical routing apparatus for directing a first optical signal and a second optical signal, the optical routing apparatus comprising:

(a) a first input port configured to provide the first optical signal;

(b) a second input port configured to provide the second optical signal;

(c) a first output port configured to receive one of the first and second optical signals;

(d) a second output port configured to receive the second optical signal; and (e) an optical switching arrangement adapted to shift among at least two distinct optical configurations, the optical switching arrangement comprising at least one fixed mirror and at least one rotatable mirror, wherein in a first of such optical configurations, the first optical signal follows a first optical path to the first output port and the second optical signal follows a second optical path to the second output port, and wherein in a second of such optical configurations, the second optical signal follows a third optical path to the first output port and the first optical signal is lost, each of such first, second, and third optical paths being defined by the optical switching arrangement.

2. The optical routing apparatus according to claim 1 wherein the optical switching arrangement comprises two fixed mirrors and two rotatable mirrors, the first optical configuration being defined by a first position for the two rotatable mirrors and the second optical configuration being defined by a second position for the two rotatable mirrors.

3. The optical routing apparatus according to claim 2 wherein each of the first, second, and third optical paths comprises a reflection off one of the two fixed mirrors and a reflection off one of the two rotatable mirrors.

4. The optical routing apparatus according to claim 1 wherein the optical switching arrangement comprises at least four fixed mirrors and a single rotatable mirror, the first and second optical configurations being defined by two different positions of the single rotatable mirror.

5. The optical routing apparatus according to claim 4, wherein the first optical path comprises a reflection off a first of the four fixed mirrors, a reflection off the single rotatable mirror when it is in a first position, and a reflection off a second of the four fixed mirrors, wherein the second optical path comprises a reflection off a third of the four fixed mirrors, a reflection off the single rotatable mirror when it is in its first position, and a reflection off a fourth of the four fixed mirrors, and wherein the third optical path comprises a reflection off the third fixed mirror, a reflection off the single rotatable mirror when it is in a second position, and a reflection off the second fixed mirror.

6. The optical routing apparatus according to claim 4 wherein the input and output ports are staggered with respect to each other so that the path lengths of the first, second, and third optical paths are substantially equal.

7. The optical routing apparatus according to claim 4 wherein (i) the input and output ports are unstaggered, with adjacent input and output ports separated from each other in the approximate ratios 1.77:1.28:1.00; and (ii) the four fixed mirrors are inclined with respect to a perpendicular in the ratio 45°°1.5 δ:45°+0.5 δ:45°−0.5 δ: 45°−1.5 δ, where δ is an angle by which the two different positions of the single rotatable mirror differ.

8. The optical routing apparatus according to claim 1 wherein the optical switching arrangement comprises a fixed mirror having a focus and a single rotatable mirror positioned at the focus, the first and second optical configurations being defined by two different positions of the single rotatable mirror.

9. The optical routing apparatus according to claim 8 wherein the fixed mirror is a composite mirror.

10. The optical routing apparatus according to claim 8 wherein the fixed mirror has the shape of a portion of a rotated conic section.

11. The optical routing apparatus according to claim 8 wherein the input and output ports are staggered with respect to each other so that the path lengths of the first, second, and third optical paths are substantially equal.

12. The optical routing apparatus according to claim 1 wherein one of the first and second input ports is separated from one of the first and second output ports by a confocal length of one of the first and second optical signals.

13. The optical routing apparatus according to claim 12 wherein each of the input and output ports is comprised by an optical fiber, and wherein at least one of such optical fibers is flattened.

14. The optical routing apparatus according to claim 13 wherein each such optical fiber comprises a core and a cladding layer surrounding the core, and wherein the cladding layer of the flattened optical fiber is shaved.

15. An optical routing apparatus for directing a first or second optical signal, the optical routing apparatus comprising:

(a) a first input port configured to provide the first optical signal;

(b) a second input port configured to provide the second optical signal;

(c) a first output port configured to receive the first optical signal;

(d) a second output port configured to receive the first or second optical signals; and (e) an optical switching arrangement adapted to shift among at least three distinct optical configurations, wherein the optical switching arrangement comprises a fixed mirror and a single rotatable mirror, the at least three distinct optical configurations being defined by three different positions of the single rotatable mirror, wherein in a first of such optical configurations, the first optical signal follows a first optical path to the second output port, wherein in a second of such optical configurations, the first optical signal follows a second optical path to the first output port, and wherein in a third of such optical configurations, the second optical signal follows a third optical path to the second output port and the first optical signal is lost.

16. The optical routing apparatus according to claim 15 wherein the fixed mirror comprises at least three fixed mirrors.

17. The optical routing apparatus according to claim 16, wherein the first optical path comprises a reflection off the single rotatable mirror when it is in a first position and a reflection off a first of the three fixed mirrors, wherein the second optical path comprises a reflection off the single rotatable mirror when it is in a second position and a reflection off a second of the three fixed mirrors, and wherein the third optical path comprises a reflection off a third of the three fixed mirrors, a reflection off the single rotatable mirror when it is in a third position, and a reflection off the first fixed mirror.

18. The optical routing apparatus according to claim 16 wherein the input and output ports are staggered with respect to each other so that the path lengths of the first, second, and third optical paths are substantially equal.

19. The optical routing apparatus according to claim 15 wherein the fixed mirror has a focus with the single rotatable mirror positioned at the focus.

20. The optical routing apparatus according to claim 19 wherein the fixed mirror is a composite mirror.

21. The optical routing apparatus according to claim 19 wherein the fixed mirror has the shape of a portion of a rotated conic section.

22. The optical routing apparatus according to claim 19 wherein the input and output ports are staggered with respect to each other so that the path lengths of the first, second, and third optical paths are substantially equal.

23. A method for directing a first optical signal and a second optical signal, the method comprising:
   (a) providing the first optical signal from a first input port;
   (b) providing the second optical signal from a second input port; and
   (c) operating an optical switching arrangement to route the first and second optical signals, the optical switching arrangement being adapted to shift among at least two distinct optical configurations,
      wherein in a first of such optical configurations, the first optical signal follows a first optical path to a first output port and the second optical signal follows a second optical path to a second output port, and
      wherein in a second of such optical configurations, the second optical signal follows a third optical path to the first output port and the first optical signal is lost, each of such first, second, and third optical paths being defined by the optical switching arrangement.

24. The method according to wherein the optical switching arrangement comprises at least one fixed mirror and at least one rotatable mirror.

25. The method according to claim 24 wherein the optical switching arrangement comprises two fixed mirrors and two rotatable mirrors, the first optical configuration being defined by a first position for the two rotatable mirrors and the second optical configuration being defined by a second position for the two rotatable mirrors.

26. The method according to claim 25 wherein each of the first, second, and third optical paths comprises a reflection off one of the two fixed mirrors and a reflection off one of the two rotatable mirrors.

27. The method according to claim 24 wherein the optical switching arrangement comprises at least four fixed mirrors and a single rotatable mirror, the first and second optical configurations being defined by two different positions of the single rotatable mirror.

28. The method according to claim 27,
   wherein the first optical path comprises a reflection off a first of the four fixed mirrors, a reflection off the single rotatable mirror when it is in a first position, and a reflection off a second of the four fixed mirrors,
   wherein the second optical path comprises a reflection off a third of the four fixed mirrors, a reflection off the single rotatable mirror when it is in its first position, and a reflection off a fourth of the four fixed mirrors, and
   wherein the third optical path comprises a reflection off the third fixed mirror, a reflection off the single rotatable mirror when it is in a second position, and a reflection off the second fixed mirror.

29. The method according to claim 27 further comprising equalizing the path lengths of the first, second, and third optical paths.

30. The method according to claim 27 wherein
   (i) the input and output ports are unstaggered, with adjacent input and output ports separated from each other in the approximate ratios 1.77:1.28:1.00; and
   (ii) the four fixed mirrors are inclined with respect to a perpendicular in the ratio $45°+1.5\ \delta:45°+0.5\ \delta:45°-0.5\ \delta:45°-1.5\ \delta$, where $\delta$ is an angle by which the two different positions of the single rotatable mirror differ.

31. The method according to claim 24 wherein the optical switching arrangement comprises a fixed mirror having a focus and a single rotatable mirror positioned at the focus, the first and second optical configurations being defined by two different positions of the single rotatable mirror.

32. The method according to claim 31 wherein the fixed mirror is a composite mirror.

33. The method according to claim 31 wherein the fixed mirror has the shape of a portion of a rotated conic section.

34. The method according to claim 31 further comprising equalizing the path lengths of the first, second, and third optical paths.

35. The method according to claim 23 wherein one of the first and second input ports is separated from one of the first and second output ports by a confocal length of one of the first and second optical signals.

36. The method according to claim 35 wherein each of the input and output ports is comprised by an optical fiber, and wherein at least one of such optical fibers is flattened.

37. The method according to claim 36 wherein each such optical fiber comprises a core and a cladding layer surrounding the core, and wherein the cladding layer of the flattened optical fiber is shaved.

38. A method for directing a first or second optical signal, the method comprising:
   (a) providing the first optical signal from a first input port;
   (b) providing the second optical signal from a second input port; and
   (c) operating an optical switching arrangement to route the first and second optical signals, the optical switching arrangement being adapted to shift among at least three distinct optical configurations,
      wherein in a first of such optical configurations, the first optical signal follows a first optical path to a second output port,
      wherein in a second of such optical configurations, the first optical signal follows a second optical path to a first output port, and
      wherein in a third of such optical configurations, the second optical signal follows a third optical path to the second output port and the first optical signal is lost.

39. The method according to claim 38 wherein the optical switching arrangement comprises at least three fixed mirrors and a single rotatable mirror, the at least three distinct optical configurations being defined by three different positions of the single rotatable mirror.

40. The method according to claim 39,
   wherein the first optical path comprises a reflection off the single rotatable mirror when it is in a first position and a reflection off a first of the three fixed mirrors,
   wherein the second optical path comprises a reflection off the single rotatable mirror when it is in a second position and a reflection off a second of the three fixed mirrors, and
   wherein the third optical path comprises a reflection off a third of the three fixed mirrors, a reflection off the single rotatable mirror when it is in a third position, and a reflection off the first fixed mirror.

41. The method according to claim 39 further comprising equalizing the path lengths of the first, second, and third optical paths.

42. The method according to claim 38 wherein the optical switching arrangement comprises a fixed mirror having a focus and a single rotatable mirror positioned at the focus, the at least three distinct optical configurations being defined by three different positions of the single rotatable mirror.

43. The method according to claim 42 wherein the fixed mirror is a composite mirror.

44. The method according to claim 42 wherein the fixed mirror has the shape of a portion of a rotated conic section.

45. The method according to claim 42 comprising equalizing the path lengths of the first, second, and third optical paths.

46. The optical routing apparatus according to claim 15 wherein, in the first of such optical configurations, the second optical signal is lost.

47. The optical routing apparatus according to claim 46 wherein, in the second of such optical configurations, the second optical signal is lost.

48. The optical routing apparatus according to claim 15 wherein, in e second of such optical configurations, the second optical signal is lost.

49. The method according to claim 38 wherein, in the first of such optical configurations, the second optical signal is lost.

50. The method according to claim 49 wherein, in the second of such optical configurations, the second optical signal is lost.

51. The method according to claim 38 wherein, in the second of such optical configurations, the second optical signal is lost.

* * * * *